US008955360B2

(12) United States Patent
Borsa et al.

(10) Patent No.: US 8,955,360 B2
(45) Date of Patent: Feb. 17, 2015

(54) TRANSVERSE ROW BUSHINGS AND METHODS WITH FREEDOM OF MOVEMENT

(71) Applicant: Johns Manville, Denver, CO (US)

(72) Inventors: Alessandro G Borsa, Evergreen, CO (US); Jason Blush, Albuquerque, NM (US)

(73) Assignee: Johns Manville, Denver, CO (US)

( * ) Notice: Subject to any disclaimer, the term of this patent is extended or adjusted under 35 U.S.C. 154(b) by 184 days.

(21) Appl. No.: 13/772,861

(22) Filed: Feb. 21, 2013

(65) Prior Publication Data

US 2013/0160497 A1    Jun. 27, 2013

Related U.S. Application Data

(62) Division of application No. 13/113,222, filed on May 23, 2011, now Pat. No. 8,402,793.

(51) Int. Cl.
| | |
|---|---|
| *C03B 37/083* | (2006.01) |
| *C03B 37/02* | (2006.01) |
| *C03B 37/08* | (2006.01) |

(52) U.S. Cl.
CPC ........... *C03B 37/083* (2013.01); *C03B 37/0203* (2013.01); *C03B 37/08* (2013.01)
USPC .............................................. 65/475; 65/495

(58) Field of Classification Search
CPC .............................. C03B 37/08; C03B 37/083
USPC ..................................................... 65/475, 495
See application file for complete search history.

(56) References Cited

U.S. PATENT DOCUMENTS 3,920,430 A * 11/1975 Carey .............................. 65/495
2006/0201207 A1 * 9/2006 Renaudin et al. ............... 65/495

* cited by examiner

*Primary Examiner* — Queenie Dehghan
(74) *Attorney, Agent, or Firm* — Robert D. Touslee (57) ABSTRACT

An exemplary bushing system utilizes a bushing having a bottom plate having a plurality of holes from which filaments are drawn, and a plurality of support-receiving elements that are each configured to receive an elongated support. The support-receiving elements extend through the bushing generally along a longitudinal axis. A frame supports the bushing and includes a pair of horizontal rails upon which the supports rest. The horizontal rails comprise a treated surface that permits movement of the elongated supports relative to the frame in the longitudinal direction as the bushing expands and contracts due to thermal heating and cooling.

9 Claims, 6 Drawing Sheets

TRANSVERSE ROW BUSHINGS AND METHODS WITH FREEDOM OF MOVEMENT

CROSS REFERENCES TO RELATED APPLICATIONS

This application is a division of application Ser. No. 13/113,222, filed May 23, 2011. This application is related to co-pending U.S. application Ser. No. 13/113,201, entitled "Transverse Row Bushings Having Ceramic Supports," filed on the same date as the present application, the complete disclosure of which is herein incorporated by this reference.

BACKGROUND OF THE INVENTION

Fiberglass is a thin glass fiber, which can be strong, lightweight, and a good insulator. These properties make fiberglass useful for a variety of applications. For example, fiberglass may be used as an insulator (e.g., an electrical insulator, a thermal insulator, or a sound insulator). Fiberglass may also be used in rigid objects, such as automobile panels, metal poles, or sports equipment (e.g., such that the rigid object consists primarily of fiberglass or such that fiberglass reinforces other materials).

Fiberglass can be made by introducing molten glass into a bushing. The bushing includes side walls and a bottom plate to contain the molten glass. The bottom plate (comprising or attached to a tip plate) includes a number of small holes. Thus, a stream of the molten glass flows from each of these holes and underlying tips. These streams may be converted into fibers.

Bushings are subject to harsh conditions. For example, the force caused by the molten material above the bottom plate may cause the bottom plate to sag over time, especially as manufacturers use increasingly larger bushings in order to produce fiberglass at a faster rate. Additionally, bushings are subject to extremely high temperatures, as the glass introduced into the bushings must stay in a molten state. Not only must the bushing withstand the high temperatures, but it must also withstand the heat expansions and subsequent contractions that accompany these temperatures. Thus, it is desirable to use a bushing system that can withstand the harsh conditions of fiber manufacturing.

BRIEF SUMMARY OF THE INVENTION

In one embodiment, the invention provides an exemplary bushing system that comprises a bushing having a bottom plate having a plurality of holes from which filaments are drawn, and a plurality of support-receiving elements that are each configured to receive an elongated support. The support-receiving elements extend through the bushing generally along a longitudinal axis. A frame is configured to support the bushing and includes a pair of horizontal rails upon which the supports are configured to rest. The horizontal rails comprise a treated surface that permits movement of the elongated supports relative to the frame in the longitudinal direction as the bushing expands and contracts due to thermal heating and cooling.

In one aspect, the treated surface comprises one or more of boron, nitrogen, and carbon. In another aspect, the treated surface may comprise a heat-treated surface. The support-receiving element may comprise a tubular support-receiving element and/or an aperture in a side wall of the bushing.

In a further aspect, the treated surface permits movement of the elongated supports relative to the frame in the longitudinal direction as the bushing expands due to thermal heating to temperatures between about 2,000 degrees F. and about 2,800 degrees F.

In another embodiment, the invention provides an exemplary method for producing glass fibers that utilizes a bushing having a bottom plate having a plurality of holes from which filaments are drawn, and a plurality of support-receiving elements, with each support-receiving element being configured to receive an elongated support. Further, the support-receiving elements extend through the bushing generally along a longitudinal axis. The bushing is positioned on a frame that includes a pair of horizontal rails upon which the supports rest. The horizontal rails comprise a treated surface that permits movement of the elongated supports relative to the frame in the longitudinal direction as the bushing expands and contracts due to thermal heating and cooling. A molten material, such as glass, is introduced to the bushing, and heat is applied. A molten stream formed from the molten material traversing through one of the plurality of holes.

The invention further provides an exemplary bushing system that comprises a bushing comprising a bottom plate having a plurality of holes from which filaments are drawn, and an elongated support extending through the bushing generally along a longitudinal axis and to support the bottom plate of the bushing. A frame is configured to support the elongated support and includes a pair of horizontal rails upon which the support is configured to rest. The support comprises a treated surface that permits longitudinal movement of the elongated support relative to the frame as the bushing expands and contracts due to thermal heating and cooling.

In one aspect, a refractory insulating castable is positioned around the bushing, and a gap void of refractory insulating castable surrounds at least part of the elongated support. In a further aspect, the treated surface comprises one or more of boron, nitrogen, and carbon. In yet another aspect, the treated surface permits movement of the elongated supports relative to the frame in the longitudinal direction as the bushing expands due to thermal heating to temperatures between about 2,000 degrees F. and around 2,800 degrees F.

Another method for producing glass fibers utilizes a bushing comprising a bottom plate having a plurality of holes from which filaments are drawn, and an elongated support extending through the bushing generally along a longitudinal axis to support the the bottom plate of the bushing. A frame includes a pair of horizontal rails upon which the support is configured to rest. The support comprises a treated surface that permits longitudinal movement of the elongated support relative to the frame as the bushing expands and contracts due to thermal heating and cooling. The elongated support is positioned on rails of the frame, and a molten material, such as glass, is introduced into the bushing. Heat is applied and a molten stream is formed from the molten material traversing through one of the plurality of holes.

In still a further embodiment, the invention provides a bushing system that is constructed of a bushing comprising a bottom plate having a plurality of holes from which filaments are drawn, and an elongated support extending through the bushing generally along a longitudinal axis. A frame is configured to support the elongated support and includes a pair of horizontal rails upon which the support is configured to rest. A movement-promoting component positioned above one of the horizontal rails and below the support. This movement-promoting component comprises a rounded surface and permits movement of the elongated support relative to the frame as the bushing expands and contracts due to thermal heating and cooling, the movement being along the longitudinal direction.

In one aspect, the movement-promoting component comprises a rod extending in a direction substantially perpendicular to the longitudinal axis. In another aspect, the movement-promoting component comprises a substantially spherical shape or may be substantially circular cross section. Also, a restraining structure is positioned adjacent to one of the horizontal rails to increase an effective edge height of the horizontal rail.

In use, a molten material to the bushing and heat is applied to produce a molten stream traversing through the holes. In some cases, the molten material comprises glass.

In one particular embodiment, a bushing system comprises means for attenuating a molten material into fibers, means for inhibiting the attenuating means from sagging, means for supporting the sagging-inhibiting means, and means for reducing friction between the sagging-inhibiting means and the supporting means.

In one aspect, the attenuating means comprises a bushing having a bottom plate with a plurality of holes, and the sagging-inhibiting means comprises an elongated support attached to the attenuating means. In one particular aspect, the friction-reducing means comprises a treated surface on at least part of the attenuating means or sagging-inhibiting means. The friction-reducing means may alternatively comprise a round object positioned between the attenuating means and the sagging-inhibiting means.

DETAILED DESCRIPTION OF THE INVENTION

As described above, over time, the bottom plate of a bushing may sag due to the load above it. To address this problem, the bottom plate may be supported by elongated supports running in a direction parallel to the plane of the bottom plate. The ends of the supports may rest on a frame surrounding the bushing, such that the supports are supported by the frame. As the bushing system is heated, the supports may expand (e.g., lengthen). Additionally, the bushing may expand, thereby increasing the space between adjacent supports. If the ends of the supports cannot easily move relative to the frame, the supports may experience tension. This tension may cause damage to the supports, the portion of the bushing that connects the bushing to the supports, and to the frame. Therefore, embodiments herein relate to bushing systems and methods that permit the ends of the supports to move relative to the frame upon heat expansion of the bushing. For example, and as described in greater detail below, a surface of the frame or the supports may be treated such that an effective friction coefficient between the elements is reduced as compared to the friction that would be expected if no treatment occurred. As another example, the frame and supports may be separated by a component (e.g., a component with a rounded surface) that reduces the effective friction coefficient between the elements.

Exemplary Bushing System

Figure 1A:
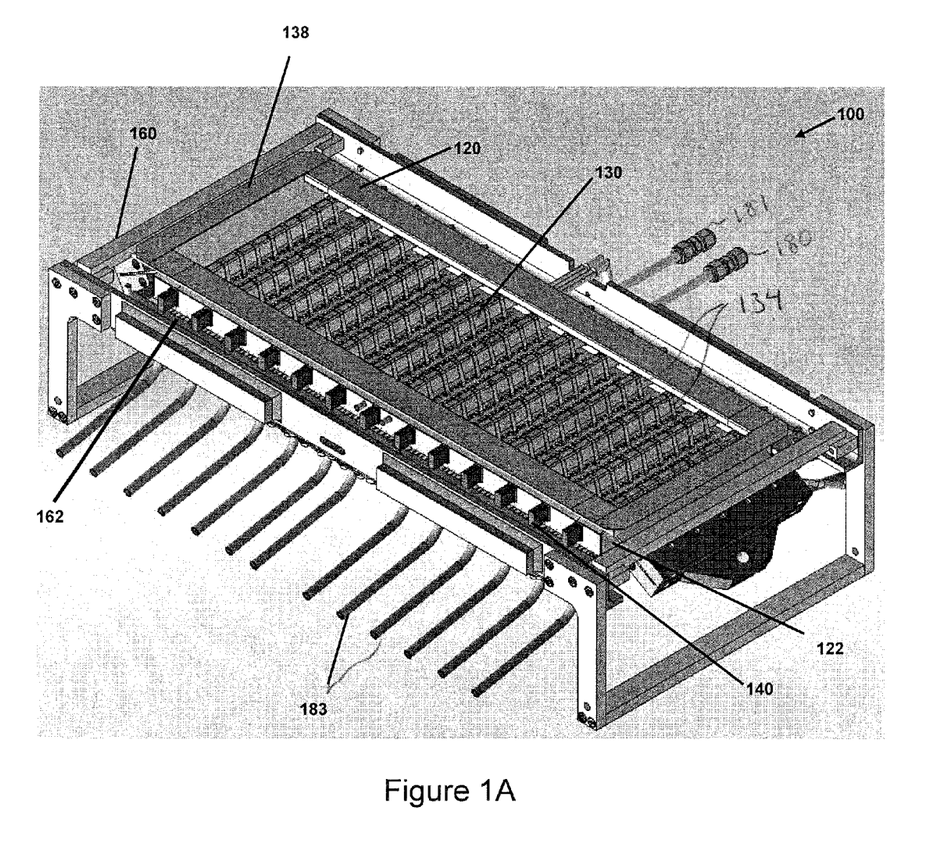
FIGS. 1A-1B show an example of a bushing system 100.
Figure 1B:
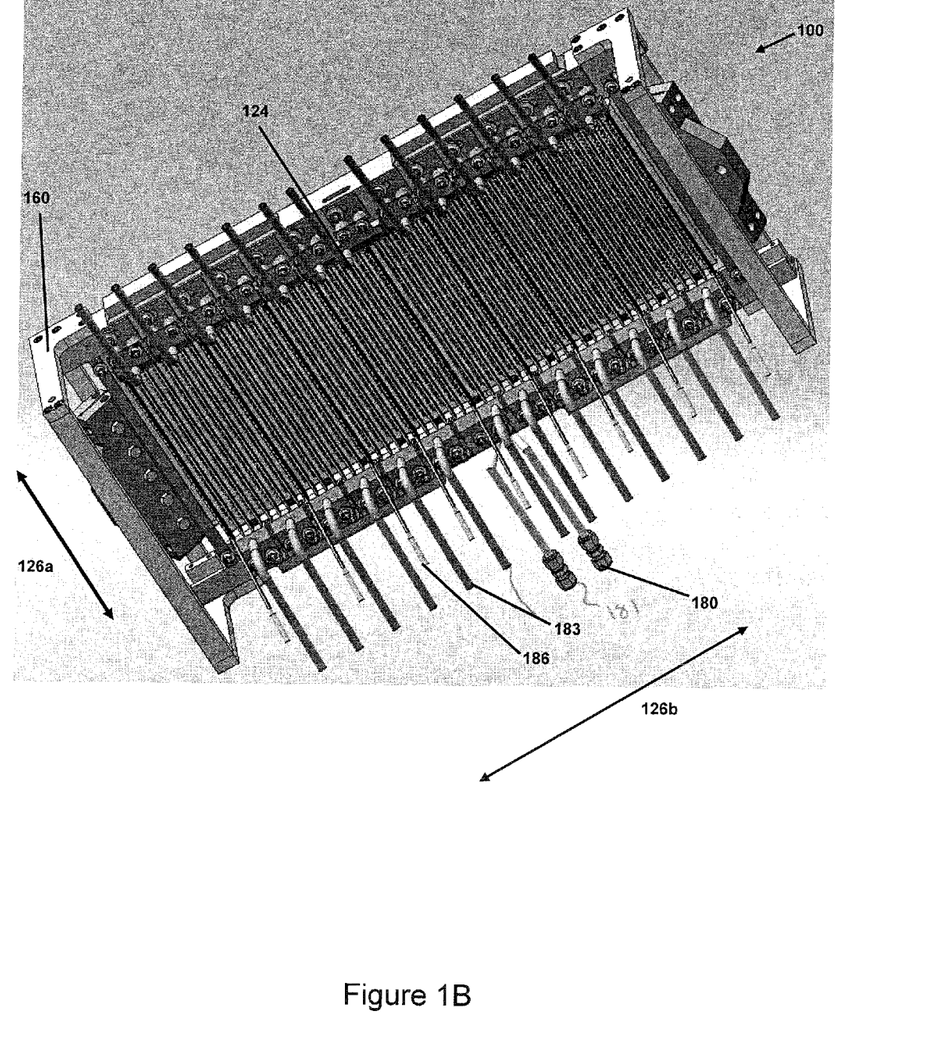

FIGS. 1A and 1B show an example of a bushing system 100. Bushing system 100 may include a bushing 120, which may comprise a material that is substantially erosion-resistant. Bushing 120 may comprise platinum, rhodium, or an alloy thereof.

Figure 2:
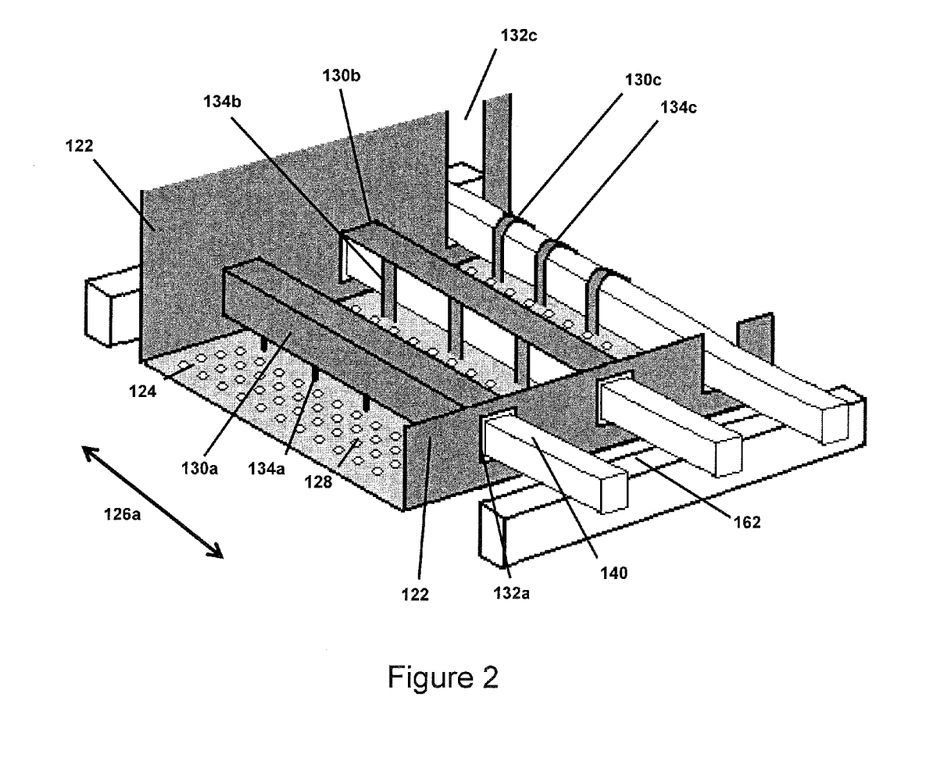
FIG. 2 shows a cut-away depiction of part of a bushing system, illustrating examples of support-receiving elements.

Bushing 120 may comprise a screen (not shown), a number of side walls 122 and a bottom plate 124. The screen may prevent contaminants in a molten material from entering the bushing 120. Bottom plate 124 extends along a longitudinal direction 126a and a horizontal direction 126b, as shown in FIG. 1B. Bottom plate 124 includes a plurality of small orifices or holes 128 (as shown in FIG. 2). In some cases, bottom plate 124 may be similar to the plates described in U.S. Patent Application No. 2010/0064734, incorporated herein by reference. As one example, bottom plate 124 may include at least, equal to, and/or up to about 25, 50, 100, 250, 500, 1,000, 2,500, 5,000 or 10,000 holes. The diameters of the holes may be at least, equal to, and/or up to about 0.1, 0.25, 0.5, 1, 2.5, 5, 10, 25, 50, 100, 250, 500 or 1,000 m. The holes may be located in rows or staggered double rows. A tip or hollow nozzle may be located beneath each hole and may be connected to, welded to or integral with the hole.

Bushing 120 may include one or more support-receiving elements 130. Side walls 122 may include an aperture 132, which can receive a support 140. In some instances, aperture 132 is only slightly larger than the support 140. Side wall 122 may include an aperture perimeter that defines the shape of aperture 132. In some instances, the aperture perimeter consists of a material different from the rest of side wall 122. The aperture perimeter may be welded to side wall 122.

Support-receiving elements 130 may be constructed in a variety of ways. Three non-limiting examples are illustrated in FIG. 2 and are referenced by reference numerals 130a, 130b and 130c and are described in more detailed hereinafter. It will be appreciated that bushing 120 may include all of the same type of support-receiving elements (e.g., all made of support-receiving elements 130a), or could include combinations of different types of support-receiving elements. Further, the support-receiving elements 130 are coupled in part to bottom plate 124 using one or more connectors 134. As also shown in FIG. 2, a variety of connectors may be used, either the same kind or different kinds. These are referenced using reference numerals 134a, 134b, and 134c and are described in more detail below.

The support-receiving elements may comprise a sleeve, tubular element, hook or the like as described in more detail below. For example, support-receiving element 130 comprises a square or rectangular tube or sleeve that extends between the two side walls 122. Between the side walls, each tubular element 130 is substantially hollow, such that, for example, a support 140 may extend completely through tubular element 130. In some embodiments, the cross-section of tubular element 130 parallels the cross-section of the support 140. Connecting support-receiving element 130 to bottom plate 124 are connectors 134. If a force is applied to bottom plate 124 (e.g., by a molten material on top of the plate) that would promote sagging of the plate, the supports 140 assist to prevent such sagging. More specifically, the top of tubular support-receiving element 130 applies a downward force since it is connected to the bottom plate 124. Support 140 counters this downward force and thus assists in preventing bottom plate 124 from sagging. As such, connecting bottom plate 124 to the support-receiving element may thus reduce or eliminate sagging.

Support-receiving element 130 of FIG. 1A is similar to support-receiving element 130a of FIG. 2. However, it will be appreciated that instead of using a continuous tube as the support-receiving element, other configurations may be used as illustrated in FIG. 2. For example, a single surface may be used to form support-receiving element 130b that sits atop support 140. Bushing 100 may include one or more connectors 134b, which may connect bottom plate 124 with support-receiving element 130b.

As another example, bushing 100 may include a support-receiving element 130c in the form of a hook 134c that also serves to couple the support-receiving element 130c to bottom plate 124. In this way, the support-receiving element and the connector comprise the same component. However, as shown in FIG. 1A a connector 134 similar to connector 134c may also be used in combination with a support-receiving element 130 that is similar to support-receiving element 130a. In FIG. 1A, connector 134 in the form of a hook may extend from bottom plate 124 up and around tubular element 130. Thus, if bottom plate 124 were to begin to sag, and support 140 pressed against the top of tubular element 130, the hook connection may inhibit bottom plate 124 from sagging.

In some embodiments, support-receiving element 130, the perimeter of aperture 132, and/or connector 134 are made of substantially the same material as that of bottom plate 124 of bushing 120. For example, this may allow support-receiving element 130a to expand in longitudinal direction 126a by an amount similar to the expansion of bottom plate 124. In some instances, support-receiving element 130, the perimeter of aperture 132 and/or connector 134 are made of a material that is different from the material of bottom plate 124. For example, support-receiving element 130 and/or connector 134 may comprise a material that is more heat-resistant and/or exhibits less heat expansion than the material of bottom plate 124. In some embodiments, support-receiving element 130, the perimeter of aperture 132, and/or connector 134 comprises a precious metal, such as platinum.

Support 140 may traverse through apertures 132 and/or support-receiving elements 134 along the longitudinal direction 126a. The supports may comprise an elongate member. For example, the length of an elongated support 140 may be at least about 5, 10, 50, 100, 500, or 1000 times greater than a width or height of elongated support 140. Support 140 may have a width or diameter, width, or height that is at least, equal to, or up to about 0.1 mm, 0.5 mm, 1 mm, 5 mm, 10 mm, 50 mm, 100 mm, or 500 mm. Support 140 may have a cross-section that is, for example, round or comprises a substantially straight line. In some instances, the cross-section is substantially a circle, a square, an oval or a rectangle. In some instances, the bottom of the cross-section is substantially flat.

Support 140 may have a width, height, or diameter that is, for example, at least, equal to, or up to about 0.1 mm, 0.5 mm, 1 mm, 5 mm, 10 mm, or 50 mm. Support 140 may have a length that is, for example, at least, equal to, or up to about 10 mm, 50 mm, 100 mm, 500 mm, or 1,000 mm. For example, in one instance, support 140 has a width of approximately 8 mm, a height of approximately 16 mm, and a length of 270 mm. Support 140 may be longer than the length bottom plate 124 in the longitudinal direction 126a. This may, for example, allow the ends of the support 140 to be supported by a frame 160. Support 140 may be, for example, at least, equal to, or up to about 0.1 mm, 0.5 mm, 1 mm, 5 mm, 10 mm, 50 mm, 100 mm, or 500 mm longer than the length of bottom plate 124 in the longitudinal direction 126a. Supports may be separated from each other by a length that is, for example, at least, equal to, or up to about 1 mm, 2.5 mm, 5 mm, 10 mm, or 25 mm, 50 mm.

Support 140 may comprise a ceramic material. Support 140 may include alumina, silicon nitride, zirconia, nickel, iron, titanium, tungsten, molybdenum, niobrium or an alloy thereof. The material of support 140 may be such that support 140 has a lower thermal expansion coefficient and/or a greater hot creep strength than does bottom plate 124.

As described in copending U.S. application Ser. No. 13/113,201, entitled "Transverse Row Bushings Having Ceramic Supports," and filed on the same date as the present application, support 140 may comprise an alumina-based ceramic, such as an alumina-based ceramic comprising alumina in major part, yttria in minor part and magnesia oxide in minor amount.

Manufacturing of support 140 from such materials may allow support 140 to exhibit less creep deformation at high temperatures than an otherwise, thereby decreasing the sag of bottom plate 124. Additionally, such materials may allow a smaller support 140 to be used to support bottom plate 124 and/or may reduce the amount of materials (e.g., precious metals) to be included in bushing system 100. Alternatively or in addition, such materials may allow support 140 to support a larger bottom plate 124 and bushing (thereby increasing a throughput rate of the system), may increase the effective life of support 140, and/or may increase the efficacy of support 140 in inhibiting sag of bottom plate 124. Manufacture of supports 140 may using any of the processes described in copending U.S. application Ser. No. 13/113,201, entitled, "Transverse Row Bushings Having Ceramic Supports, and filed on the same date as the present application.

In some embodiments, support 140 may be substantially solid. In some embodiments, support 140 is substantially hollow. In some embodiments, support 140 comprises a hollow and a solid part.

As shown in FIGS. 1A and 1B, frame 160 may support bushing 120. In one embodiment, frame 160 supports an exterior portion of the bushing. For example, the frame may support an outer portion of the bushing surrounding the portion of the bushing comprising holes 128. In some instances, bushing 120 may comprise one or more flanges 138. Flanges 138 may extend over a portion of frame 160. In some instances, flanges 138 extend along longitudinal direction 126a.

Frame 160 may support elongated supports 140. For example, as shown in FIGS. 1A and 1B, supports 140 may extend beyond bushing 120 in the longitudinal direction. Part or all of the portion of the supports extending beyond bushing 120 may be supported by frame 160. In some instances, frame 160 supports bushing 120 by supporting supports 140. In some instances, frame 160 directly supports bushing 120.

Frame 160 may include one, two or more horizontal rails 162, which extend along horizontal direction 126b. Horizontal rails 162 may provide an upward force on supports 140. In some embodiments, one or more lateral portions of supports 140 rest on horizontal rails 162. The lateral portions may, for example, include an end portion of support 140 and/or a portion of the support that is not directly above bottom plate 124. In some embodiments, support 140 does not directly rest on horizontal rails 162, but one or more lateral portions of supports 140 are positioned over horizontal rails 162 and are indirectly supported by the rails. For example, one or more movement-promoting elements may separate the rails from the lateral portions, as discussed in more detail below.

Frame 160 may comprise a metal. For example, frame 160 may comprise iron or steel. Frame 160 may comprise a material or may itself have a lower thermal expansion coefficient and/or a greater hot creep strength than does bottom plate 124 or than does support 140. In some instances, different parts of frame 160 are made from different materials.

Bushing 160 may be heated in order to ensure that material contained within the bushing is kept within a desired temperature. For example, bushing 160 may be heated to over 2000° F. to ensure that molten glass within the bushing stays in the molten state. These high temperatures may cause parts of bushing 160 and supports 140 to expand. If supports 140 are not free to move with respect to frame 160, damage may be caused to one or more of support 140, bushing 120 (e.g., at aperture perimeters on side wall 122 or support-receiving element 130), and frame 160. For example, at high temperatures, the welding connecting aperture perimeters to side wall 122 may fail and support-receiving element 130 may tear, which may result in molten material (e.g., molten glass) leaking from bushing 120. Thus, in some embodiments, bushing systems are provided that reduce friction, permit relative movement, and/or promote relative movement between supports 140 and frame 160 (e.g., horizontal rails 162) at high temperatures (e.g., 2200°-2400° F.).

In one embodiment, a surface of frame 160 (e.g., a surface of horizontal rails 162) is treated. The treatment may include, for example, nitriding, boronizing, boronnitriding, carburizing, carbonizing the support surface. The treatment may include a surface heat treatment. The treatment may comprise applying a coating to the surface of support 140. The coating may be applied, for example, by flame-spraying, anodizing, paint brushing, dipping, spraying, or brushing the support. The coating may comprise a low-friction material. The coating may comprise a ceramic material, boron, nitrogen, carbon or boron nitride (e.g., available from Momentive Performance Materials). In some instances, the entire surface of horizontal rails 162 is treated. In some instances, only a portion of the surface of horizontal rails 162 is treated. For example, in FIGS. 1A and 1B, a top surface of horizontal rails 162 may be treated (not shown) and/or the portion of horizontal rails 162 expected to be positioned under supports 140 may be treated (not shown). In some instances, treating a surface of frame 160 comprises adding a layer to frame 160. For example, horizontal rails 162 may comprise a low-friction lower layer or a low-friction exterior layer (surrounding the rails). The low-friction layer may comprise, for example, boron, carbon, nitrogen, or boron nitride.

Treating one or more surfaces of support 140 may reduce the effective coefficient of friction between support 140 and frame 160. (That is, the minimum force required to move support relative to the frame 160 and/or rails 162 may be less when the system includes a treated surface as compared to a comparable system without a treated surface.) Thus, the heat-induced expansion or contraction from subsequent cooling may not apply as much strain to the bushing system and may prevent or reduce damage to system parts.

Bushing 120 may be electrically heated in order to ensure that molten material within the bushing remains within a desired temperature range. Insulating the sides of the bushing may improve efficiency and uniformity of the heating. Thus, refractory insulating castable (not shown) may be positioned adjacent to the bushing's side walls 122, such that, for example, it surrounds the top, bottom and ends of supports 140. Refractory insulating castable may comprise a ceramic material. In some embodiments, refractory insulating castable is poured between a part of frame 160 and bushing 120, for example, after supports 140 have been positioned in support-receiving elements 130. The castable may have a low density to allow it to crush during expansion of the busing and not cause the bushing metal parts to buckle.

However, surrounding support 140 and rails 162 with refractory insulating castable may inhibit or prevent support 140 from moving relative to the frame, even if an above-described movement-promoting component was included in the system. Thus, in some embodiments, bushing system 100 includes a space surrounding the portion of the support 140 that would otherwise be surrounded by refractory insulating castable. This space may be empty (i.e. filled only with air) or may include a material other than refractory insulating castable (e.g., a less rigid material).

As described in further detail below, in some instances, a spacer material is applied to all of or a portion of supports 140 and/or frame 160 (e.g., horizontal rails 162). For example, each support 140 may be surrounded by a spacer material. Spacer material may include a material that will substantially disappear in high temperatures (e.g., temperatures above 2000° F.). For example, spacer material may burn away at these temperatures. Spacer material may comprise, for example, a plastic, a foam, a wax, or Styrofoam. Spacer material may be applied before refractory insulating castable is integrated with the system. In some instances, spacer material is applied to supports 140, refractory insulating castable is poured in an area adjacent to bushing 120, and bushing system 100 is heated to high temperatures. The spacer material may burn away, thereby leaving an open space surrounding support 140 in the location outside bushing 120. This space may prevent refractory insulating castable from inhibiting movement of support 140 relative to rails 162.

Bushing system 100 further includes a cooling water inlet 180 that leads to a cooling loop that lays on top of the bushing flange to seal to the bushing block to keep molten glass from escaping. Adjacent cooling water inlet 180 is a cooling water outlet 181. Also, cooling water tubes 183 permit cooling water to be used to cool the bushing. Tubes 183 extend traverse across the bushing to permit cool water to be input from one side and the water to be removed from the other side. Tubes 186 provide air that is used during hanging to induce outside downward air flow along the array of bushing tips to further provide cooling during fiberization of the primary glass strands.

Support-Receiving Elements

As described above, a bushing may include one or more support-receiving elements. FIG. 2 shows a cut-away depiction of a part of other bushing-system embodiments, which, for example, illustrate several other examples of support-receiving elements 230a-230c. In each of the three depicted example, side walls 222 include an aperture 232, which can receive a support. In some instances, the aperture (e.g., aperture 232a) is only slightly larger than the support 240. In some instances, the aperture (e.g., aperture 232c) extends to the top or to the bottom of the wall. While FIG. 2 shows two apertures corresponding to each support, a side wall 222 may include larger apertures 232 that can receive multiple supports.

As described in connection with FIG. 1A, support-receiving element 230 may be comprise a sleeve or a tubular element. FIG. 2 shows an example where a tubular support-receiving element 230a is used in a bushing. In this instance, tubular element 230a includes a substantially solid, continuous surface extending between two side walls 222. Additionally each tubular element 230a may be substantially hollow, such that, for example, a support 240 may extend completely through tubular element 230a. In this instance, the cross-section of tubular element 230a parallels the cross-section of the support 240. As described in further detail below, tubular element 230a is connected to bottom plate 224 (which comprises holes 228). Thus, if a force is applied to bottom plate 224 (e.g., by a molten material on top of the plate) that would promote sagging of the plate, the supports 240 (being supported by horizontal rails 262) may press on the top of tubular support-receiving element 230a. Connecting bottom plate 224 to the support-receiving element may thus reduce or eliminate sagging.

Support-receiving element 230b comprises a top surface. Support 240 can then be positioned beneath the top surface. Support 240 may apply an upwards force on the top surface of support-receiving element 230b when a downwards force is applied to bottom plate 224 of a bushing. Thus, connecting bottom plate 224 to support-receiving element 230b may reduce or eliminate sagging that may otherwise occur.

Support-receiving element 230c comprises an element extending from bottom plate 224 over support 240. In some instances, element 230c comprises a hook-shape; in some instances, element 230c comprises a U-shape. Support 240 may apply an upwards force on the top portion of support-receiving element 230c when a downwards force is applied to bottom plate 224 of a bushing. Thus, connecting bottom plate 224 to support-receiving element 230c may reduce or eliminate sagging that may otherwise occur.

As describe above, the bushing may include one or more connectors 234, which may connect bottom plate 224 with support-receiving element 230. Connectors 234 may include for example, a rod (e.g., 234a), a plate, a bar (e.g., 234b), a U-shaped component (e.g., 234c) or a hook. Connector 234 may be independent of support-receiving element 230 (e.g., connectors 234a and 234b are distinct from support-receiving elements 230a and 230b) or connector 234 may comprise support-receiving element 230 (e.g., connector 234c comprises support-receiving element 230c).

In some embodiments, bottom plate 224 is rigidly connected to support 240. For example, hooks of connector 234c may be firmly attached to support 240, or a shape or material of the hook may discourage movement of support 240 relative to component 234c. In some embodiments, connectors 234 and/or support-receiving element 230c are configured to allow support 240 to move relative to bottom plate 224. For example, support 240 may be able to slide and/or expand longitudinally (and independently of bottom plate 224) within support-receiving element 230a. As another example, hooks of connector 234c may permit movement of support 240 relative to component 234c.

FIG. 2 shows a plurality of connectors 234 connecting bottom plate 224 to a single support 240. In some instances, support 240 is connected to bottom plate 224 by a single connector. For example, connectors 234 may include a vertically oriented plate that extends across a substantial portion or across the entire bottom plate 224 in the longitudinal direction 226a. As another example, a single component (e.g., a post) may be positioned substantially in the center of bottom plate 224 along the longitudinal direction 226a.

FIG. 2 shows a variety of support-receiving elements 230 and a variety of connectors 234. A bushing system may include a plurality of support-receiving elements 230 (e.g., to receive multiple supports 240) and a plurality of connectors 234. In some instances, the connectors are all of the same type and/or the support-receiving elements are all of the same type. In other instances, a system may include multiple types of connectors and/or multiple types of support-receiving elements (e.g., as shown in FIG. 2). While FIG. 2 shows pairs between specific types of connectors 234 and support-receiving elements 230, the pairs may be rearranged and/or other types of connectors 234 and support-receiving elements 230 not specifically described herein may be used.

Friction-Reducing Treatments and Mechanisms

Figure 3A:
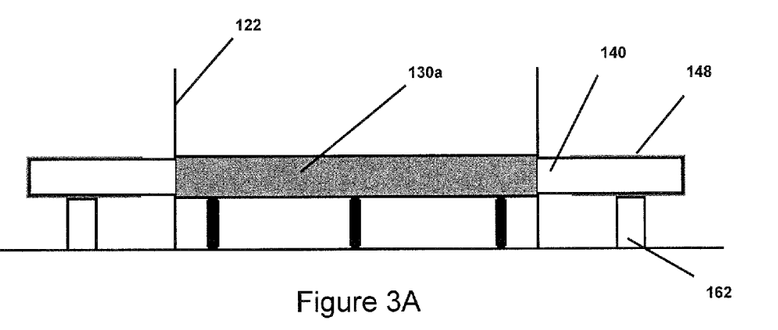
FIGS. 3A-3C show cross-sections of part of a bushing system, illustrating examples of friction-reducing means.

As described above, a surface of a frame may be treated. FIG. 3A shows a cross-section of part of another exemplary bushing system. In this instance, the top surfaces of horizontal rails 362, which face support 340, include a treated surface 348.

Figure 3B:
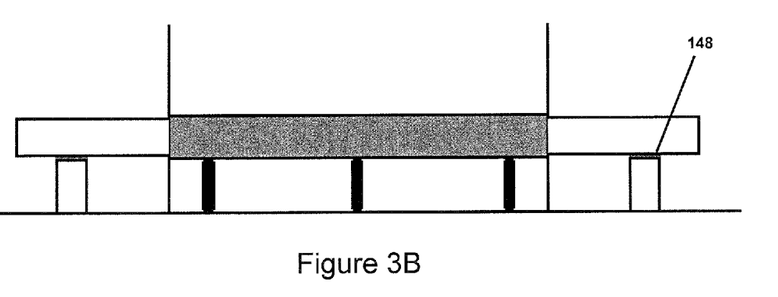

In some instances, a surface of a support 340 may be treated instead of or in addition to treating a surface of a frame. FIG. 3B, for example, shows a cross-section of part of a bushing system where the end portions of the support 340 comprise a top treated surface 348. In this instance, the end portion includes a portion of the support that is outside of a bushing's side walls 322 and is not positioned within support-receiving element 330a. In some embodiments, the portion may extend, for example, to a part of the support slightly inside side wall 322 and/or inside support-receiving element 330a. In some instances, the entire support may be treated, a bottom surface of support 140 may be treated, and/or only a portion of the support expected to be positioned above horizontal rails 362 may be treated.

Figure 3C:
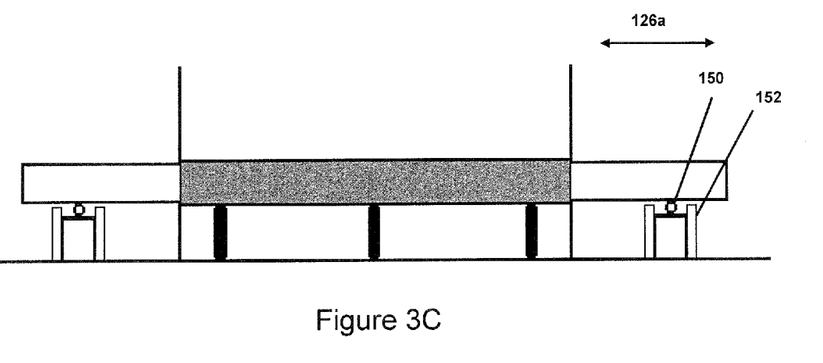

In some embodiments, a movement-promoting component 350 is positioned between a part of a frame (e.g., horizontal rails 362) and support 340. Movement-promoting component 350 may comprise a rounded surface. Movement-promoting component 350 may be configured to move or roll in the longitudinal direction 326a and/or in the horizontal direction (not shown) relative to horizontal rail 362. Movement-promoting component 350 may comprise a round, oblong or oval cross-section. Movement-promoting component 350 may comprise, for example, a shape that is substantially a rod (e.g., a brazing rod) or a sphere. For example, FIG. 3C shows a cross-section of part of a bushing system including a movement-promoting component 350 that comprises a rod with a circular cross-section. Thus, in this embodiment, as support 340 expands in the longitudinal direction 326a, movement-promoting component 350 moves in the longitudinal direction 326a away from the bushing's side wall 322. This may relieve tension applied to the system. Movement-promoting component 350 may comprise a metal or ceramic material.

In some instances, movement-promoting component 350 extends along at least half, substantially all, or all of the length of horizontal rails 362. In some instances, one or more independent movement-promoting components 350 are associated with each support 340. Additional restraining structures 352 may be provided adjacent to rails 362 or on rails 362 (e.g., on the top edges of rails 362) to prevent movement-promoting component 350 from falling off, rolling off, or becoming disengaged from rails 362 or becoming disengaged from support 340. Restraining structures 352 may also be provided between supports 340 (e.g., for circumstances where movement-promoting component 350 is of a substantially spherical shape) to ensure that component 350 remains under an associated support 340. In some instances, movement-promoting component is attached or tethered to horizontal rails 362.

Treating one or more surfaces of support 340 or of the frame and/or providing movement-promoting component may reduce the effective coefficient of friction between support 340 and the frame. (That is, the minimum force required to move support 340 relative to the frame and/or rails 362 may be less when the system includes movement-promoting component 350 or treated surface as compared to a comparable system without movement promoting component 350.) Thus, the heat-induced expansion or contraction from subsequent cooling may not apply as much strain to the bushing system and may prevent or reduce damage to system parts.

Refractory Insulating Castable and Spacers

Figure 4:
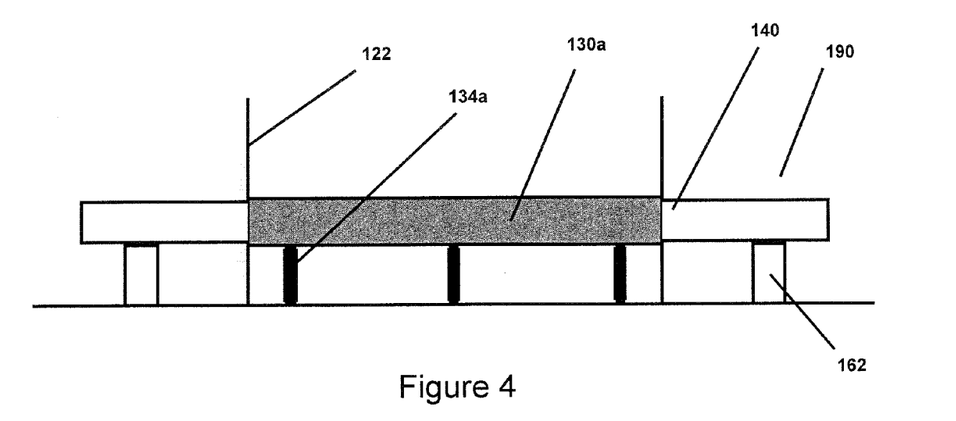
FIG. 4 shows a cross-section of part of a bushing system including a refractory insulating castable.

As described above, a bushing may be insulated in order to, for example, improve the efficiency and uniformity of heating the bushing. FIG. 4 shows a cross-section of part of an exemplary bushing system where the bushing is insulated using a refractory insulating castable 490. In this instance, refractory insulating castable 490 abuts side walls 422 of the bushing. It surrounds the exposed support 440 outside of the bushing and the horizontal rails 462. Refractory insulating castable 490 is not within the bushing, and thus, it does not surround portions of support 490 between side walls 422, support-receiving elements 422 or connectors 434a.

As described above, completely surround support 440 with refractory insulating castable 490 may prevent support 440 from being able to move relative to horizontal rail 462, which may therefore strain the bushing system. Thus, it may be desirable to create a gap in the refractory insulating castable around at least a portion of the support.

Figure 5A:
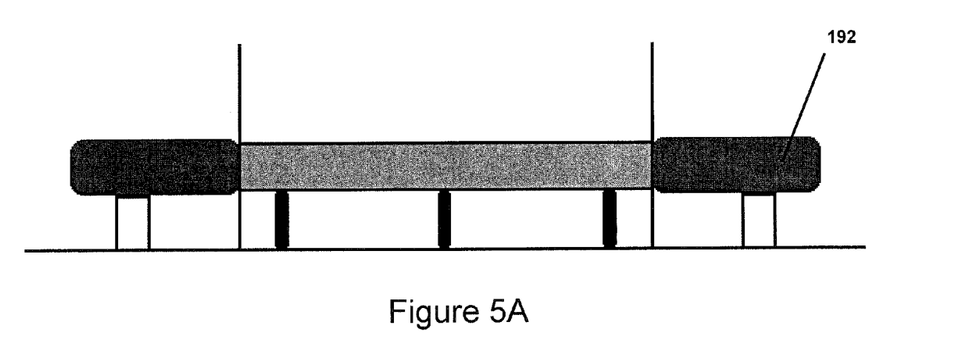
FIGS. 5A-5B show a cross-section of part of a bushing system, wherein a spacer material is used to create a gap around part of the system.

For example, FIG. 5A shows a cross-section of part of a bushing system where a portion of support 540 is surrounded by spacer material 592. In this instance, the portion of support 540 corresponds to the portions outside side walls 522 of a bushing. In some instances, more of support 540 or all of support 540 is surrounded by spacer material 592. For example, part of the portion of support 540 that is within support-receiving element 530a may also be surrounded by spacer material 592. In some instances, less of support 540 is surrounded by spacer material 592. In some embodiments, part or all of horizontal rails 562 are surrounded by material 592. For example, spacer material 592 shown in FIG. 5A may be extended downwards (e.g., only in areas substantially underlying supports 540). This may, for example, allow for easier application of the material generally and/or after supports 540 have been positioned within a bushing system.

Figure 5B:
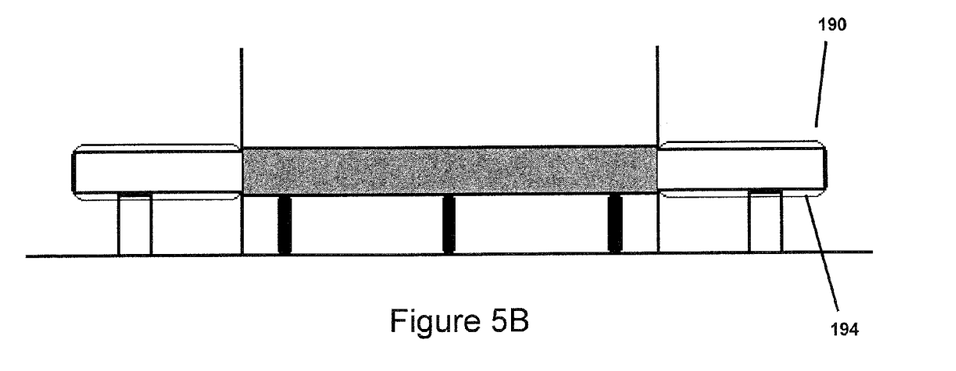

Spacer material 592 may include a material that will substantially disappear in high temperatures (e.g., temperatures above 2000° F.). For example, spacer material 592 may burn away at these temperatures. Spacer material may comprise, for example, a plastic, a foam, a wax, or Styrofoam. Spacer material 592 may be applied before refractory insulating castable 590 is integrated with the system. In some instances, spacer material 592 is applied to support 540, refractory insulating castable 590 is poured in an area adjacent to side walls 522 of a bushing, and a bushing system is heated to high temperatures. As illustrated in FIG. 5B, spacer material 592 may burn away, thereby leaving an open space 594 surrounding at least a portion of support 540 (e.g., in the location outside side walls 522). This space may prevent refractory insulating castable 590 from inhibiting movement of support 540 relative to rails 562.

Fiber Manufacturing Process

Figure 6:
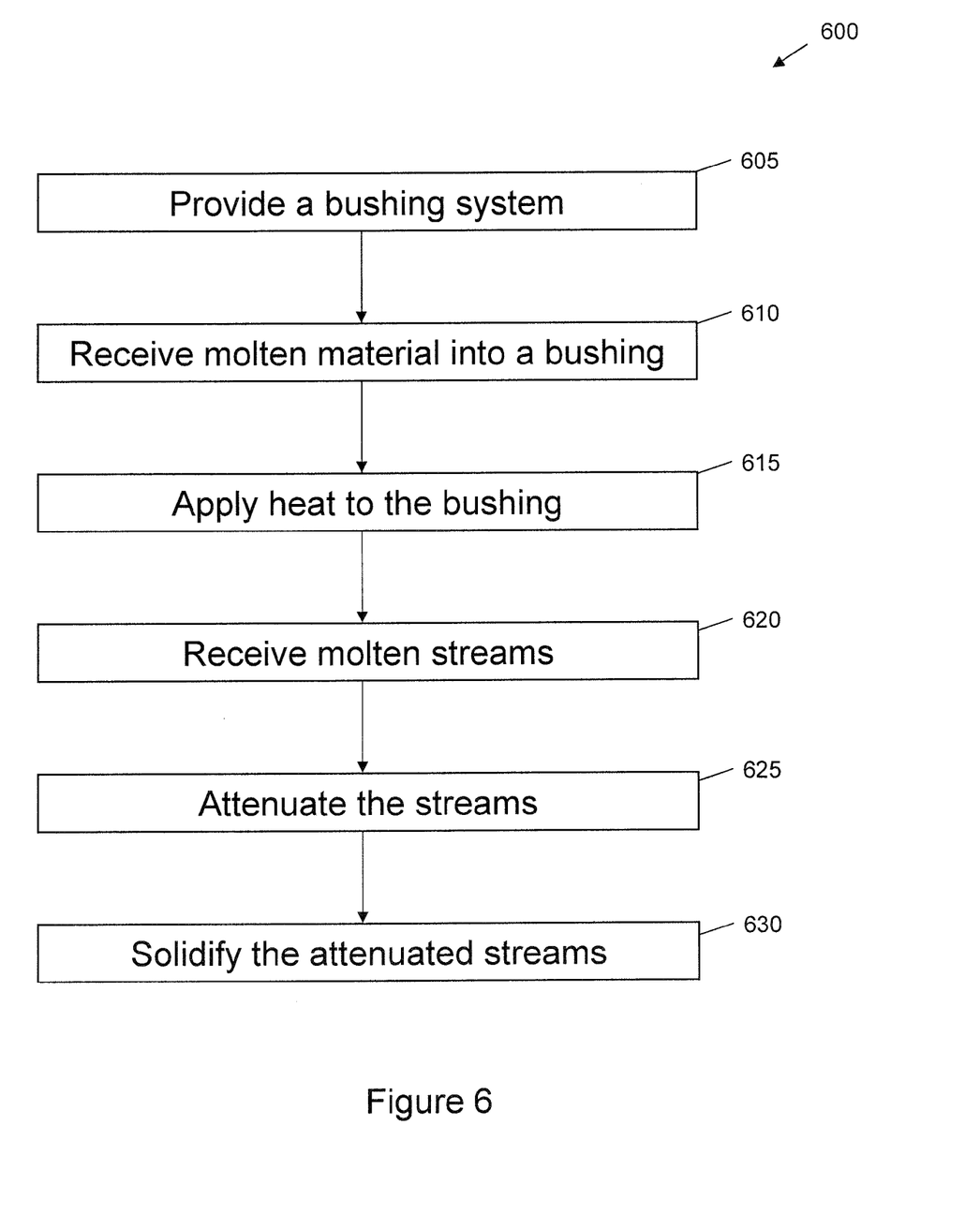
FIG. 6 shows a process for manufacturing fibers.

FIG. 6 shows a process 600 for manufacturing fibers. At 605, a bushing system is provided. The bushing system may include any parts and may have any properties described herein. For example, the bushing system may include a bushing, supports to support a bottom plate of the bushing, a frame to support the supports, a friction-reducing means to reduce the effective friction between the supports and the frame, and a space—void of refractory insulating castable—surrounding a portion of the supports outside the bushing.

At 610, a molten material is received into a bushing of a bushing system. In some instances, a forehearth receives the molten material (e.g., a molten glass) from a refining zone of a melting furnace. While the material is in the forehearth, the temperature of the molten material may decrease and/or the molten material may be mixed. A plurality of refractory lined legs may extend from the forehearth to one or more bushings. The molten material may pass through a screen of the bushing, which may prevent contaminants in the molten material (e.g., fragments from the refractory lined legs) from entering the bushing.

At 615, heat is applied to the bushing. In some instances, bushing is electrically heated, e.g., by applying current to electrical terminals connected to the bushing. The bushing may be heated to a temperature that is within a center or upper portion of a fiberizing range for the material. If the temperature is too high, the material flowing out of holes of the bushing may form into discrete droplets and may not be able to be pulled into fibers. If the temperature is too low, the fiber may subsequently break due to excessive shear stresses during attenuation of the fiber. Thus, the bushing may be maintained at a temperature not associated with either of these disadvantages. The bushing may need to be maintained at a temperature higher than the ideal fiberizing temperature, as cooling may occur within tips under a bottom plate of the bushing. In some instances, the bushing is maintained at a temperature that is at least, equal to, or up to about 1,800° F., 2,000° F., 2,200° F., 2,400° F., 2,600° F., or 2,800° F. The temperature may be one which allows the molten material to exit tips underlying a bottom plate in the upper portion of the fiberizing range, such that the molten material exiting the tips forms into cones at the end of tip.

At 620, molten streams (produced through holes of the bushing) are received. In some instances, the molten material itself creates a sufficient head pressure to cause the material to exit through holes on a bottom plate, thereby forming molten streams. The streams may be received closely below each tip end under the bottom plate. In some instances, the molten streams comprise a molten cone formed under tips underlying the bottom plate. A high-speed winder may catch the streams and may subsequently attenuate them.

At 625, the streams are attenuated. During attenuation, the diameter of the streams may be decreased by a factor of, for example, at least, equal to, or up to about 2, 5, 10, 20, 50 or 100, to result in diameters of, for example, at least, equal to, or up to about 1, 5, 10, 13, 16, 19, 25, 50 or 100 microns. The winder may apply tension and pull the streams at hundreds to tens of thousands of feet per minute to reduce the diameter. The molten material may be cooled during the attenuation to a temperature of, for example, about. At 630, the attenuated streams are solidified by continuing to cool the material. For example, the material may be subsequently cooled to a temperature just below the glass transition temperature (for example, in Eglass it may be cooled to a temperature around 800 degrees F. to about 900 degrees F.).

What is claimed is:

1. A method for producing glass fibers, the method comprising:
    providing a bushing comprising:
        a bottom plate having a plurality of holes from which filaments are drawn, the bottom plate having a longitudinal axis; and
        a plurality of support-receiving elements, wherein each support-receiving element is configured to receive an elongated support, and wherein the support-receiving elements extend through the bushing generally along the longitudinal axis;
    positioning the bushing on a frame, wherein the frame includes a pair of horizontal rails upon which the supports rest, and wherein the horizontal rails comprise a treated surface that permits movement of the elongated supports relative to the frame in the longitudinal direction as the bushing expands and contracts due to thermal heating and cooling;

introducing a molten material to the bushing;
applying heat to the bushing; and
receiving a molten stream formed from the molten material traversing through one of the plurality of holes.

2. The method of claim 1, wherein the molten material comprises glass.

3. The method of claim 1, further comprising attenuating the received molten stream.

4. A method for producing glass fibers, the method comprising:
providing the bushing system comprising a bushing comprising:
a bottom plate having a plurality of holes from which filaments are drawn, the bottom plate having a longitudinal axis;
an elongated support extending through the bushing generally along the longitudinal axis and applying an upward force on the bottom plate of the bushing; and
a frame that includes a pair of horizontal rails upon which the support is configured to rest,
wherein the support comprises a treated surface that permits movement of the elongated support relative to the frame as the bushing expands and contracts due to thermal heating and cooling, the movement being along the longitudinal direction;
positioning the elongated support onto rails of the frame;
introducing a molten material to the bushing;
applying heat to the bushing; and
receiving a molten stream formed from the molten material traversing through one of the plurality of holes.

5. The method of claim 4, wherein the molten material comprises glass.

6. The method of claim 4, further comprising attenuating the received molten stream.

7. A method for producing glass fibers, the method comprising:
providing the bushing system comprising:
a bushing comprising a bottom plate having a plurality of holes from which filaments are drawn, the bottom plate having a longitudinal axis;
an elongated support extending through the bushing generally along the longitudinal axis and applying an upwards force on the bottom plate of the bushing;
a frame comprising a pair of horizontal rails upon which the support is configured to rest, and
a movement-promoting component positioned above one of the horizontal rails and below the support, wherein the movement-promoting component comprises a rounded surface and permits movement of the elongated support relative to the frame as the bushing expands and contracts due to thermal heating and cooling, the movement being along the longitudinal direction;
placing the elongate support onto the rails of the frame;
introducing a molten material to the bushing;
applying heat to the bushing; and
receiving a molten stream formed from the molten material traversing through one of the plurality of holes.

8. The method of claim 7, wherein the molten material comprises glass.

9. The method of claim 7, further comprising attenuating the received molten stream.

* * * * *